United States Patent [19]
Van Dijk

[11] 3,797,981
[45] Mar. 19, 1974

[54] APPARATUS FOR CONTINUOUSLY PRODUCING TUBULAR FOAMED POLYURETHANE INSULATION

[75] Inventor: Jan C. Van Dijk, Delft, Netherlands

[73] Assignee: Shell Oil Company, New York, N.Y.

[22] Filed: Oct. 25, 1972

[21] Appl. No.: 300,695

Related U.S. Application Data

[62] Division of Ser. No. 815,129, April 10, 1969, Pat. No. 3,733,382.

[52] U.S. Cl. ............. 425/110, 264/47, 264/309, 425/122, 425/392, 425/817 C
[51] Int. Cl. ............................................. B29d 27/00
[58] Field of Search ........ 425/103, 110, 817, 817 C, 425/4, 4 C, 329, 111, 114, 122, 392, 393; 264/47, 51, 262, 309

[56] References Cited
UNITED STATES PATENTS

| | | | |
|---|---|---|---|
| 1,949,226 | 2/1934 | Wallace | 425/392 |
| 3,354,244 | 11/1967 | Davidson | 425/4 C X |
| 3,443,276 | 5/1969 | Smith et al. | 264/47 X |
| 3,649,730 | 3/1972 | Benteler et al. | 425/4 C X |

Primary Examiner—R. Spencer Annear
Assistant Examiner—Mark Rosenbaum
Attorney, Agent, or Firm—Fredrik Marlowe

[57] ABSTRACT

Apparatus for continuously producing tubular foamed polyurethane insulation in which a liquid foamable polyurethane composition is supplied to a rotary ring dispenser which centrifugally sprays the liquid onto a flexible sleeve positioned around and spaced from a pipe. The sleeve and dispensed liquid are moved axially relative to the dispenser and the outer surface of the sleeve is supported while the liquid foams and expands radially to fill the space between the pipe and the sleeve.

3 Claims, 4 Drawing Figures

PATENTED MAR 19 1974

APPARATUS FOR CONTINUOUSLY PRODUCING TUBULAR FOAMED POLYURETHANE INSULATION

This is a division, of application Ser. No. 815,129, Pat. No. 3,733,382 filed Apr. 10, 1969.

BACKGROUND OF THE INVENTION

The invention relates to a method and apparatus for continuously producing tubular foamed polyurethane insulation.

Foamed polyurethane is a natural wall known for its outstanding qualities as a thermal insulant. It can be made in the form of rigid insulation scales ready for application on a pipe or other surface to be insulated. Alternatively, the insulation can be made in situ by pouring or spraying a liquid, foamable polyurethane composition directly on the surface of a pipe, tank wall or other body to be insulated.

Although foamed polyurethane is an excellent insulating material, its use is on the whole rather more expensive than some of the more conventional insulation materials such as glass wool or asbestos wool. One reason is the slow and therefore costly production of the ready-made scales in individual moulds in a discontinuous process. According to an alternative method in which a foamable polyurethane coating is applied by spraying directly on a pipe continuous production is possible, but in this way a regularly shaped insulation around and along the pipe cannot be obtained. Moreover, high material losses occur, and outdoor application on existing pipelines is highly weather and wind dependent. Still other methods have the same or different shortcomings, for example, they do not produce an insulation of constant density and cell size, are difficult to practice or cannot be used at all for pipelines already laid in the field.

SUMMARY OF THE INVENTION

Therefore it is the object of the invention to provide a method which allows fast, simple and continuous production of a foamed polyurethane insulation having satisfactory qualities.

According to the invention a method of continuously producing tubular foamed polyurethane insulation comprises feeding a liquid, foamable polyurethane composition or its components to a rotary ring forming dispenser mounted rotatably around a pipe which is positioned coaxially within a flexible, tubular body or sleeve; rotating the dispenser around the pipe whereby the received liquid composition is discharged centrifugally from the dispenser as a spray onto the inner face of the flexible tubular body, the dispenser simultaneously and continuously being moved axially relative to the tubular body; allowing the liquid composition on the tubular body to foam and thereby expand radially to fill the space between the pipe and tubular body whilst supporting the tubular body at its outer face, and allowing the foamed polyurethane to harden. The invention further provides an apparatus for continuously producing tubular foamed polyurethane insulation according to the above method, comprising a rotary ring dispenser having a central opening therein, centering means for mounting a pipe coaxially with the dispenser through the central opening thereof, driving means for rotating the dispenser on its axis, supply means for feeding a liquid, foamed polyurethane forming composition to the dispenser, the reel holding means adapted to hold a plurality of reels of sheet material in a regular arrangement with respect to the circumference of the dispenser, and a tubular support mounted coaxially with and extending around the dispenser for supporting the sheet material when drawn off the reels and through the support.

The centrally located pipe can be an internal calibration pipe for sizing the internal diameter of the tubular insulation. The calibration pipe is moved simultaneously with the dispenser in the axial direction, whereby the calibration pipe is continuously being withdrawn from the polyurethane tube produced around the pipe. To avoid adherence of the polyurethane to the calibration pipe the surface of this pipe is made of a release material such as polypropylene or another polyolefinic material, or polytetrafluoroethylene. The formed polyurethane tube can be cut in sections of the desired length, and these sections in turn can be cut lengthwise to form two identical halves suitable for mounting around a pipeline to be insulated.

Alternatively, the pipe through the central opening of the dispenser is a pipe to be insulated in situ. In that case the insulation is to remain on the pipe, and therefore the pipe will move jointly with the moving sheets forming the tubular body of paper or other flexible material around it. The pipe may form part of a pipeline already laid in the field, in which case the invention is particularly meritorious since the assembly of dispenser, means of supplying the polyurethane composition, means for rotating the dispenser, reels with paper sheets, and guide means for the paper sheet can be mounted on a common frame designed as a vehicle adapted to travel over the pipeline to be insulated.

BRIEF DESCRIPTION OF THE DRAWINGS

The invention will be further explained by way of example with reference to the accompanying diagramatic drawing, in which.

DESCRIPTION OF THE PREFERRED EMBODIMENTS

Figure 1:
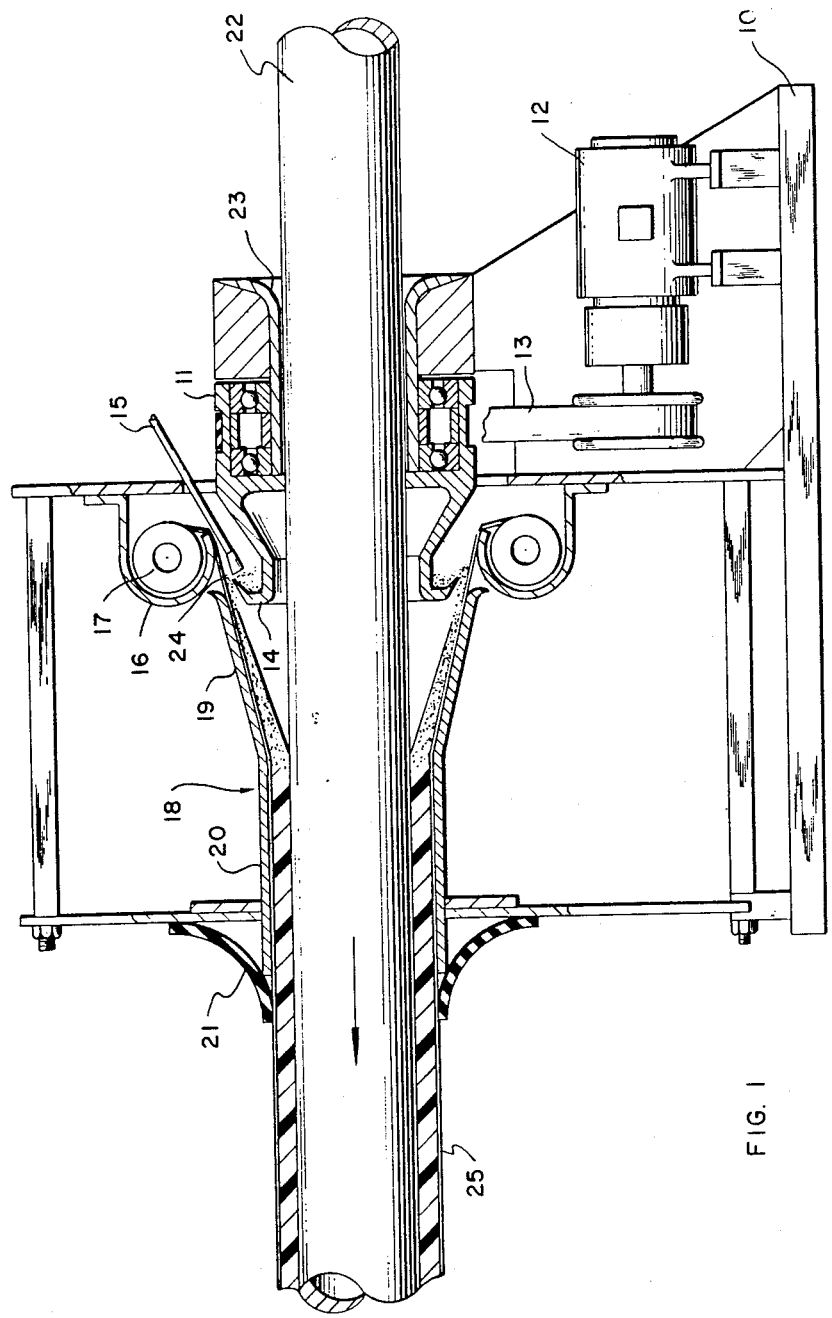
FIG. 1 is an elevational view partly in section of one embodiment of the apparatus of the invention used for insulating pipe.

The apparatus of FIG. 1 comprises a stationary frame 10 rotatably supporting a rotary ring dispenser 11 which can be rotated by an electric motor 12 through a belt 13. The dispenser comprises a circularly extending trough-shaped portion 14. A liquid, foamed polyurethane forming composition can be supplied through a supply pipe 15 for discharge on a radially extending surface portion of the trough 14. Preferably the end portion of the supply pipe 15 near the trough 14 is inclined so as to discharge the liquid onto the trough 14 in the direction of the circumferential velocity of the rotating trough. The frame 10 also carries a series of reel holders 16 mounted around the dispenser in regular fashion and each holding a reel 17 of continuous paper sheet 24. The arrangement of reels 17 is such that the axis of the reels together form the sides of a regular polygon, for example an octagon if eight reels are provided.

The frame further comprises a tubular guide 18 of which an initial part is formed as a truncated cone 19 having its wide end located around the dispenser and having at its narrow end a cylindrical extension 20. The guide 18 is mounted coaxial with the dispenser 11. At the forward end of the cylinder 20 and coaxial therewith a calibration disc 21 of rubber or another flexible material is mounted. The single disc 21 may be replaced by a plurality of flexible strips in circular arrangement. In order to reduce the friction between the insulation to be formed and the guide 18, the cylindrical portion 20 is preferably made as short as possible, the calibration mainly being effected by the disc 21.

In operation a pipe 22 to be insulated is inserted through the dispenser 11 and guide 18 in coaxial position therewith. The coaxial positioning of the pipe 22 in the assembly is facilitated if the central portion of the dispenser is designed as a bearing 23 for the pipe 22, aligning the pipe with the dispenser whilst allowing relative axial movement of the two. Alternatively, the pipe is aligned with centering wheels mounted to the frame, as will be described later with reference to FIG. 3.

Paper sheets 24 are unwound from their reels 17 and drawn through guide 18, whereby the sheets 24 on entering the conical portion 19 of the guide with their longitudinal edges overlap the edges of the adjacent sheet to form a fully enclosed surface around the trough 14 of the dispenser. On forward movement through the guide 18 the edges of the sheets will gradually overlap further until the narrow end of the cone 19 is reached from where the sheets form a tubular body or sleeve.

The flexible tubular body being sprayed with polyurethane is normally made of paper sheets, but the tube can be formed of other flexible materials such as thin metal sheets or fabric webs. Normally the tubular body is built together from several continuous sheets which are shaped to form an enclosure large enough to pass over the dispenser.

The initial portion of the tubular body is preferably shaped as a truncated cone formed by moving the sheets with their longitudinal axis coinciding with the generatrix of the cone 19, in a converging path. At the narrow end of the cone the sheets move further in parallel relationship forming a cylindrical body. The dispenser is positioned within the wide end of the cone. During the time the sheets are moved forward forming a truncated cone the edges of the sheets are caused to overlap increasingly. The composite tubular body can also be formed by winding the sheet or sheets in a screw like fashion, but this method is complicated and therefore less desirable.

The sheets should be wide enough to ensure that the dispenser is entirely surrounded by the sheet material, leaving no holes between the edges of two adjacent sheets through which polyurethane could escape.

After rotation of the dispenser 11 by the motor 12 has started, the polyurethane composition is supplied through the supply pipe 15 to the trough 14. By the high rotational speed of the dispenser the liquid composition received thereon is driven to the circumference of the trough 14 and is centrifugally discharged therefrom as a fine spray. As the liquid is flowing over the surface of the dispenser as a thin film the various components of the liquid are intensively mixed. Therefore, the components can be supplied individually to the dispenser, if desired. The homogeneous and uniform spray of liquid is received on the inner face of the sheets 24 opposite the dispenser, the sheets 24 being externally supported by the guide 18. While the liquid is sprayed, the pipe 22 is moved continuously in the axial direction as indicated by an arrow. The leading ends of the sheets 24 have been attached to the surface of the pipe, so that simultaneously with the pipe 22 the sheets 24 are drawn forward from the reels 17 through the guide 18. Thus, the portions of the sheets 24 on which the polyurethane liquid has been sprayed by the dispenser are moved towards the cylindrical part 20 of the guide. During this movement the polyurethane liquid on the sheets expands by foaming, so that in the cylinder 20 the polyurethane foam fills the annular space between the cylinder 20 and pipe 22. On leaving the cylinder 20 the foaming has been completed, so that around the pipe a foamed polyurethane coating 25 has been formed which is accurately shaped by the cylinder 20 and of which the surface may be further smoothed by passage through the orificed disc 21. If necessary, the foam is allowed to harden on the pipe until it has become sufficiently rigid to handle the pipe.

Before any portion of the pipe 22 has been coated, the leading ends of th sheets 24 must be connected to the pipe with an adhesive. Once operations are proceeding the sheets 24 become firmly bonded to the polyurethane coating and remain thereon as a protective layer.

The rotary ring dispenser on being rotated around the pipe is capable of discharging the polyurethane liquid received on its surface as a fine spray from its circumferential edge by centrifugal forces generated by the rotation. In its simplest form the dispenser is a saucer shaped element with a central opening through which the pipe has been inserted. The polyurethane liquid which is a mixture of various components is further homogenized as it flows over the surface of the dispenser. The residence time of the liquid on the ring is dependent on various factors such as size and design of the ring, its rotational speed, and the viscosity of the polyurethane liquid. Under otherwise constant conditions, the residence time of the liquid on the ring can be increased by extending the surface of the ring with profiled portions, for example a curved rim. Generally the circumference of the dispenser is circular, but small serrations or other minor iregularities may be provided if desired to control or improve the atomization of the liquid being discharged.

Figure 2:
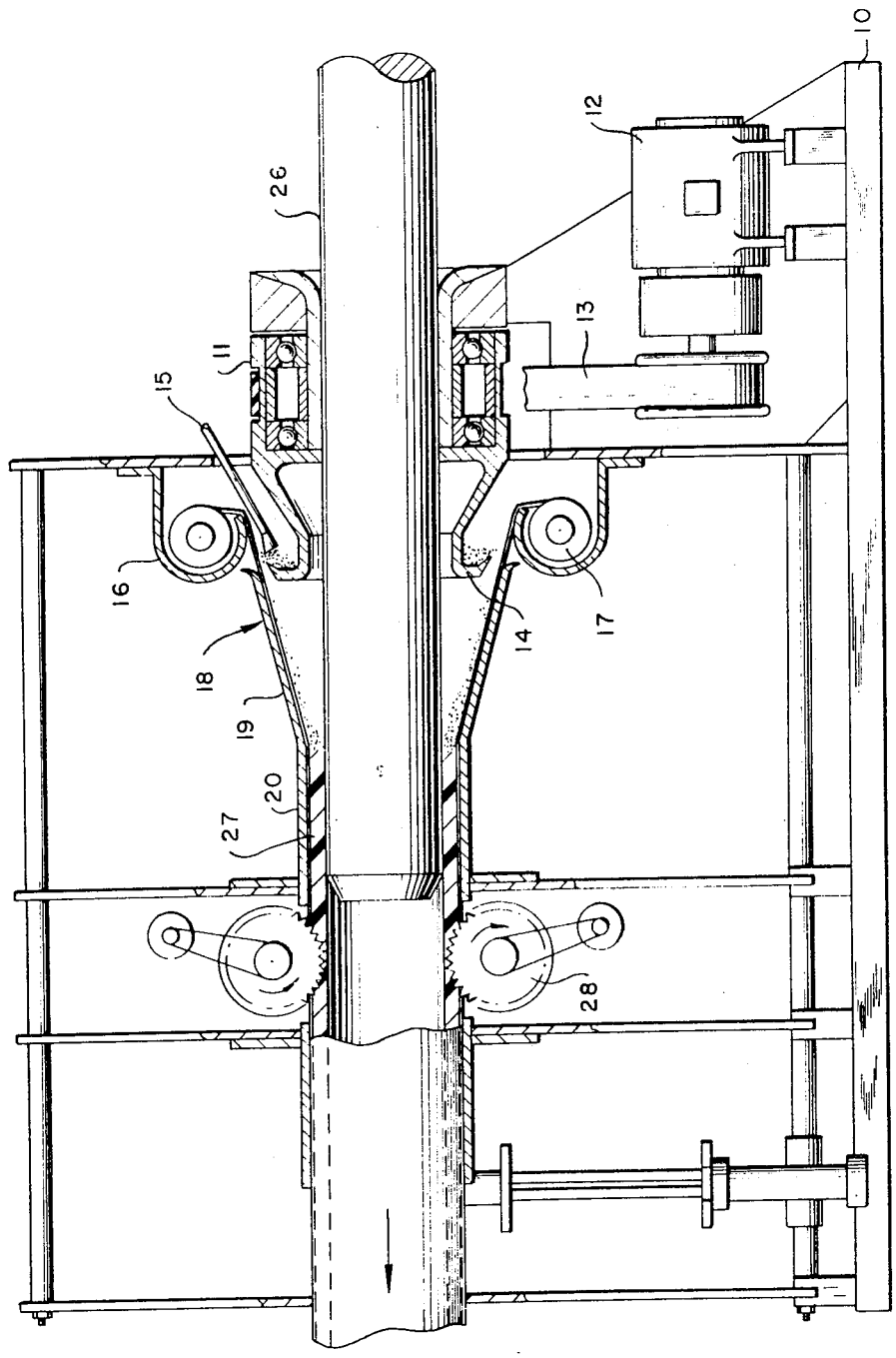
FIG. 2 is an elevational view of an apparatus similar to the one of FIG. 1 but adapted for making prefabricated pipe scales.

The apparatus of FIG. 2 is in many respects identical to the one of FIG. 1, but there are a few differences in view of its intended use for making loose pipe scales. For this reason, the centrally located pipe 26 inserted through the dispenser 11 and guide 18 is no longer moved axially but remains stationary. As used herein, the term 'pipe' is intended to include a solid as well as a tubular member. The pipe 26 serves as an internal sizing member or mandrel for the scales to be formed, and since the polyurethane foam will move along the stationary pipe 26 the surface thereof or the entire pipe is made of a material not adhering to the foam, for example polypropylene. The resulting product is a tubular insulation which is drawn forward by a pipe hauling device. At the same time the paper sheets bonded to the surface of the insulation are drawn forward. The foamed insulation tube 27 can be cut lengthwise by circular blade saws 28 mounted on the frame and also in sections of the desired length to form pairs of pipe scales ready for mounting around a pipeline to be insulated.

Figures 3, 4:
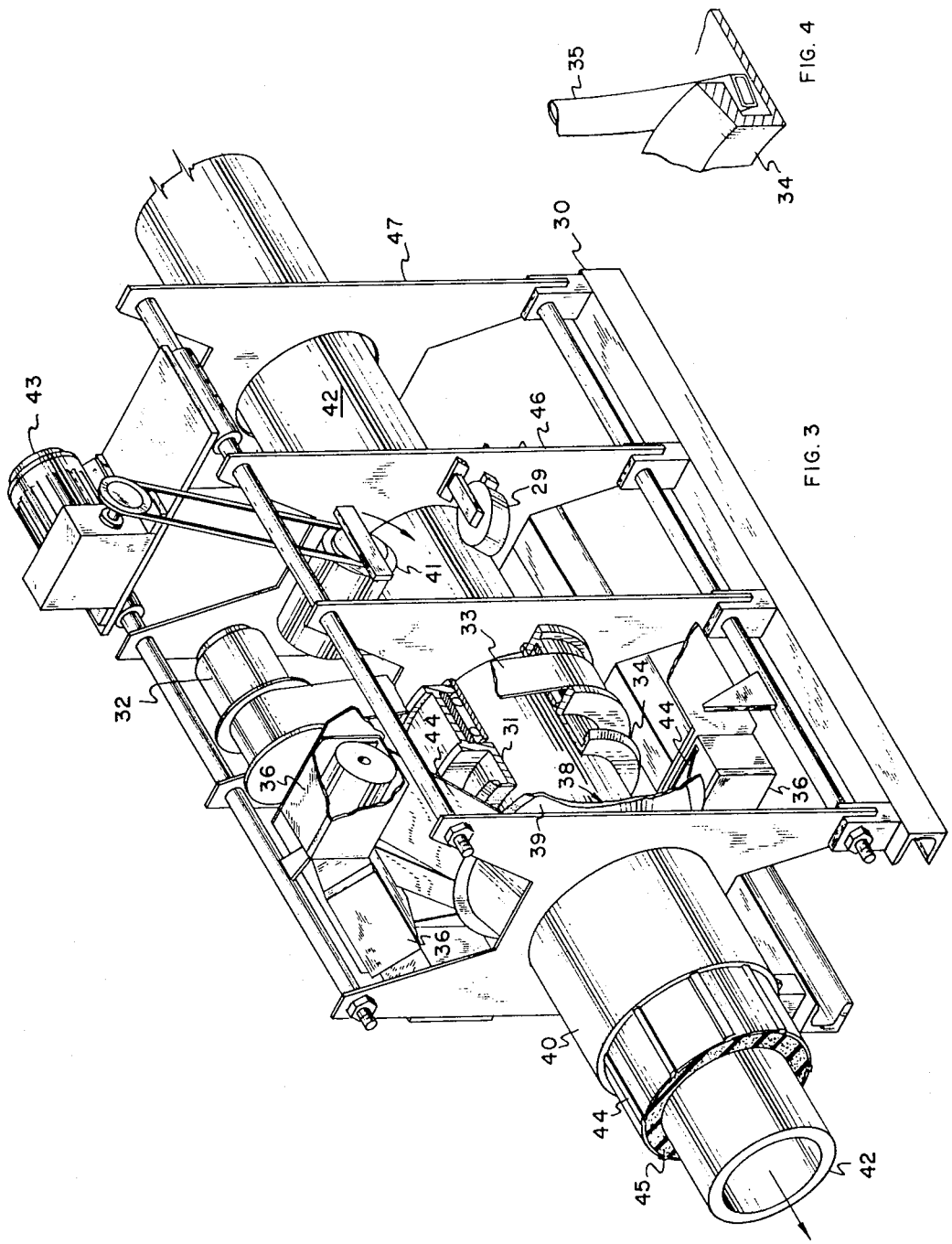
FIG. 3 is a perspective view of an apparatus similar to the one of FIG. 1 but adapted to be moved over an existing pipeline to be insulated.
FIG. 4 is a detail view of the dispenser of the apparatus of FIG. 3.

The apparatus diagrammatically shown in perspective view in FIG. 3 is in principle similar to the apparatus of FIG. 1, but it has been designed as a vehicle adapted to travel over a pipeline.

Like the apparatus of FIG. 1 the apparatus of FIG. 3 comprises a frame 30, rotary ring dispenser 31 having a trough-shaped section 34, a motor 32 with belt 33 for rotatably driving the dispenser 31, reel holders 36, carrying reels 37 of flexible sheets 44, and a guide 38 comprising a frusto-conical part 39 and a cylindrical part 40. A section of the trough 34 of the dispenser with supply pipe 35 for feeding the polyurethane liquid thereon is shown in FIG. 4.

The apparatus does not receive the pipe to be coated in a bearing inside the dispenser ring as in the design of FIG. 1, but between centering wheels 29 mounted in the frame. These wheels 29 align the pipe 42 with the ring dispenser 31. One of the centering wheels is also a drive wheel 41 which can be driven by an electric motor 43 to move the entire apparatus over the pipeline 42 (to the right in FIG. 3).

To ensure proper alignment of the apparatus with the pipeline, two groups of the centering wheels 29 are provided; one group of three centering wheels being connected to a vertical plate 46 of the frame and a second group of three centering wheels being connected to another vertical plate of the frame some distance from the first plate, for example plate 47 (wheels not shown). Power is supplied to the electric motors 32, 43 and the polyurethane liquid is supplied to the supply pipe 35 from a truck travelling along the pipe track. If it is desired to mount the apparatus on a pipeline at a point between the terminals thereof, it is necessary to design the apparatus in two separable or hingeable halves. The operation of the apparatus of FIG. 3 is the same as in FIG. 1, except that the pipe is now kept stationary and the apparatus is being moved over it.

The invention is not limited to the production if insulations having a circular cross-section. Other shapes may be produced, for example square cross-sections for making ducts.

What I claim is:

1. An apparatus for producing tubular foamed polyurethane insulation, said apparatus comprising:
   a frame;
   a rotary ring dispenser mounted on said frame for centrifugally dispensing a liquid foamable polyurethane composition, said dispenser having a central opening therein;
   centering means carried by said frame for mounting a pipe coaxially with the dispenser through the central opening thereof;
   rotating means attached to said frame and operatively connected to said dispenser for rotating said dispenser about its axis to centrifugally dispense a liquid foamable polyurethane composition;
   supply means for feeding a liquid foamable polyurethane composition to said dispenser;
   reel holding means rotatably mounted on said frame and adapted to carry a plurality of reels of sheet material in a regular spaced relationship with respect to the circumference of said dispenser; and
   tubular support means mounted on said frame coaxially with said dispenser for supporting the outer surface of said sheet material when drawn off the reels and through the tubular support means, said tubular support means and said reels of sheet material being arranged relative to said dispenser so that said liquid composition is dispensed onto the inner surface of said sheet material.

2. An apparatus as defined in claim 1 wherein the tubular support means comprises:
   a conical section having its wide end disposed around said dispenser; and
   a cylindrical section connected to the narrow end of the conical section and coaxial therewith.

3. An apparatus as defined in claim 2 wherein said frame is adapted to travel over the pipe inserted through the opening of the dispenser and further includes pipe engaging drive means for moving said frame relative to said pipe.

* * * * *